US012497146B2

(12) United States Patent
Kamei (10) Patent No.: US 12,497,146 B2
(45) Date of Patent: Dec. 16, 2025

(54) WEARABLE ARTIFICIAL GILL (71) Applicant: Amphibio Limited, London (GB)

(72) Inventor: Jun Kamei, London (GB)

(73) Assignee: AMPHIBIO LIMITED, London (GB)

( * ) Notice: Subject to any disclaimer, the term of this patent is extended or adjusted under 35 U.S.C. 154(b) by 916 days.

(21) Appl. No.: 17/254,591

(22) PCT Filed: Jun. 20, 2019

(86) PCT No.: PCT/GB2019/051734
§ 371 (c)(1),
(2) Date: Dec. 21, 2020

(87) PCT Pub. No.: WO2019/243826
PCT Pub. Date: Dec. 26, 2019

(65) Prior Publication Data
US 2021/0163104 A1  Jun. 3, 2021

(30) Foreign Application Priority Data

Jun. 20, 2018  (GB) ...................... 1810160

(51) Int. Cl.
*B63C 11/18*  (2006.01)
*B01D 69/02*  (2006.01)
(Continued)

(52) U.S. Cl.
CPC ............ *B63C 11/184* (2013.01); *B01D 69/02* (2013.01); *B01D 71/32* (2013.01); *B33Y 80/00* (2014.12); *B63C 11/04* (2013.01); *B63C 11/22* (2013.01)

(58) Field of Classification Search
CPC .............. B01D 69/02; B32B 2307/724; B32B 2307/7246; B32B 2307/7265;
(Continued)

(56) References Cited

U.S. PATENT DOCUMENTS 3,488,771 A * 1/1970 Chase .................... B64D 10/00
                                                          D24/110.3
4,019,987 A * 4/1977 Krasnow ................ B01D 29/07
                                                          210/232
(Continued)

FOREIGN PATENT DOCUMENTS

BE  1024595 B   4/2018
CA  2605195 A1  4/2009
(Continued)

OTHER PUBLICATIONS

Jie Wang, Lin Ye, Structure and properties of polyvinyl alcohol/polyurethane blends, Elsevier, pp. 390-396. (Year: 2014).*
(Continued)

*Primary Examiner* — Margaret M Luarca
(74) *Attorney, Agent, or Firm* — Brian J. Colandreo; Jeffrey T. Placker; Holland & Knight LLP (57) ABSTRACT An artificial gill garment (100) is provided for providing oxygen to a wearer in an underwater environment. The artificial gill garment comprises a membrane (110) configured to allow permeation of air through the membrane and prevent permeation of water through the membrane. The membrane is configured to provide an air reservoir. A method of manufacturing the artificial gill garment is also provided.

16 Claims, 9 Drawing Sheets

(51) Int. Cl.
*B01D 71/32* (2006.01)
*B33Y 80/00* (2015.01)
*B63C 11/04* (2006.01)
*B63C 11/22* (2006.01)

(58) Field of Classification Search
CPC .............. B32B 2307/728; A41D 13/02; A41D 13/0025; A41D 7/00; A41D 31/102; A41D 31/14; B63C 11/184; B63C 11/04; B63C 11/06; B63C 2011/043; B63C 2011/046; B63C 11/22; B63C 11/12; B63C 11/18
See application file for complete search history.

(56) References Cited

U.S. PATENT DOCUMENTS

| | | | |
|---|---|---|---|
| 4,034,416 A * | 7/1977 | Buffkin | B63C 11/06 |
| | | | 285/283 |
| 4,740,183 A * | 4/1988 | McKenzie | B63C 9/093 |
| | | | 441/103 |
| 4,932,078 A | 6/1990 | Jones | |
| 9,132,251 B2 | 9/2015 | Johansen | |
| 2004/0000232 A1 | 1/2004 | Van Horne | |
| 2004/0200478 A1 * | 10/2004 | Gordon | B63C 11/24 |
| | | | 128/201.27 |
| 2005/0217676 A1 | 10/2005 | Parker | |
| 2008/0295828 A1 | 12/2008 | Lande | |
| 2009/0101143 A1 | 4/2009 | Frimann | |
| 2011/0290247 A1 * | 12/2011 | Raisch | A61B 5/087 |
| | | | 128/201.27 |
| 2013/0108845 A1 | 5/2013 | Tee | |
| 2013/0318672 A1 * | 12/2013 | Gordon | A41D 13/012 |
| | | | 2/2.15 |
| 2014/0163124 A1 * | 6/2014 | Kurashina | B01D 67/0083 |
| | | | 422/133 |
| 2017/0124747 A1 * | 5/2017 | Knowlton | A61F 2/5046 |
| 2017/0275790 A1 * | 9/2017 | Arvidson | D03D 15/46 |
| 2019/0009496 A1 * | 1/2019 | Trouba | B32B 27/36 |

FOREIGN PATENT DOCUMENTS

| | | |
|---|---|---|
| CN | 1835812 A | 9/2006 |
| CN | 102691175 B | 9/2012 |
| CN | 103029819 A | 4/2013 |
| CN | 203020531 U | 6/2013 |
| CN | 104207390 A | 12/2014 |
| CN | 104788712 A | 7/2015 |
| CN | 105083500 A | 11/2015 |
| CN | 105984135 B | 10/2016 |
| CN | 106672180 A | 5/2017 |
| CN | 108116640 A | 6/2018 |
| EP | 0337631 A1 | 10/1989 |
| EP | 0757923 A1 | 2/1997 |
| GB | 1116504 A | 6/1968 |
| JP | 48-077111 A | 10/1973 |
| JP | 2000335487 A | 12/2000 |
| KR | 2014021264 A | 2/2014 |
| KR | 20140065042 A | 5/2014 |
| KR | 20150014650 A | 2/2015 |
| KR | 20150014761 A | 2/2015 |
| KR | 20160093262 A * | 8/2016 ............ B63C 11/18 |
| KR | 20170090930 A | 8/2017 |
| WO | 9615027 A1 | 5/1996 |
| WO | 9817375 A1 | 4/1998 |
| WO | 2019/243826 A1 | 12/2019 |

OTHER PUBLICATIONS

Zhoukun He, et al., Fabrication of Polydimethylsiloxane films with special surface wettability by 3D printing, Elsevier, pp. 58-65. (Year: 2017).*

"GEHR Plastics PMMA Acrylic," https://www.matweb.com/search/datasheet.aspx?matguid=210751b21d6146878491fbf2e596d6c7&n=1&ckck=1 (Year: 2024).*

Chinese Second Office Action issued in related Application Serial No. 2019800547283 on Nov. 18, 2022.

Japanese Notice of Reasons for Refusal Office Action issued in Application Serial No. 2021-520475 on Jun. 19, 2023.

International Search Report and Written Opinion issued in International Application Serial No. PCT/GB2019/051734 mailed on Aug. 24, 2019.

Search Report issued on Nov. 26, 2019 in GB Patent Application No. 1908854.1.

Search Report issued on Dec. 14, 2018 in GB Patent Application No. 1810160.0.

Chinese First Office Action issued in Application Serial No. 2019800547283 on May 17, 2022.

* cited by examiner

WEARABLE ARTIFICIAL GILL

CROSS-REFERENCE TO RELATED APPLICATIONS

This application is a U.S. National Stage of International Patent Application No. PCT/GB2019/051734, filed 20 Jun. 2019, which claims priority to Great Britain Patent Application No: 1810160.0, filed on 20 Jun. 2018, the disclosure of which is incorporated herein by reference in their entirety.

FIELD OF THE INVENTION

The present invention relates to an artificial gill garment, a method of manufacturing an artificial gill garment, a precursor material composition for making a gas permeable waterproof membrane, and a method of manufacturing a gas permeable waterproof membrane.

BACKGROUND

Environmental changes caused by human activity include sea level rises and partial or total flooding of coastal cities. There is also ever-decreasing space for building on land to accommodate a growing global population. A number of countries and cities are preparing for such potentially drastic changes (and also to take advantage of marine environments more generally) by developing aquatic living environments on the surface of or in water.

For example, the Netherlands is experimenting with a city built on water ("A Dutch Architect Offshores the Future of Housing", www.nytimes.com). Amphibious hotels have been built in resort beaches ("Underwater hotel room opens off the cost of Zanzibar", www.dezeen.com). The Japanese firm Shimizu Corp has goals of building floating cities in the Tokyo Bay and in the equatorial zone during this century ("The Botanical Future City Concept of a Plant-like City", www.shimz.co.jp).

In such potentially submerged urban areas, the surrounding water can be exploited. At water depths of approximately 10 m or less, there is enough oxygen to be harvested for human consumption, there is enough light permeation through the water to enable humans to see, and the water pressure is bearable for repeated diving by humans.

Some aquatic insects have evolved to breathe in underwater environments. This may be achieved by the insects utilising a porous superhydrophobic layer or surface. When the surface is submerged in water, a thin layer of air (i.e., a gas gill) forms on the body of the insect, such that the superhydrophobic surface acts as an air retainer. The thin layer of air also acts as a gas exchange interface with the surrounding water. If oxygen is depleted in the thin layer of air, oxygen dissolved in the surrounding water may pass through the superhydrophobic layer to the thin layer of air to compensate for the concentrate difference of oxygen between the thin layer of air and the surrounding water. Similarly, when carbon dioxide exhaled by the insect builds up in excess in the thin layer of air, excess carbon dioxide may pass through the superhydrophobic layer and dissolve in the surrounding water to neutralise the concentration difference of carbon dioxide between the thin layer of air and the surrounding water. This mechanism of gas exchange is known as plastron respiration.

Figure 1:
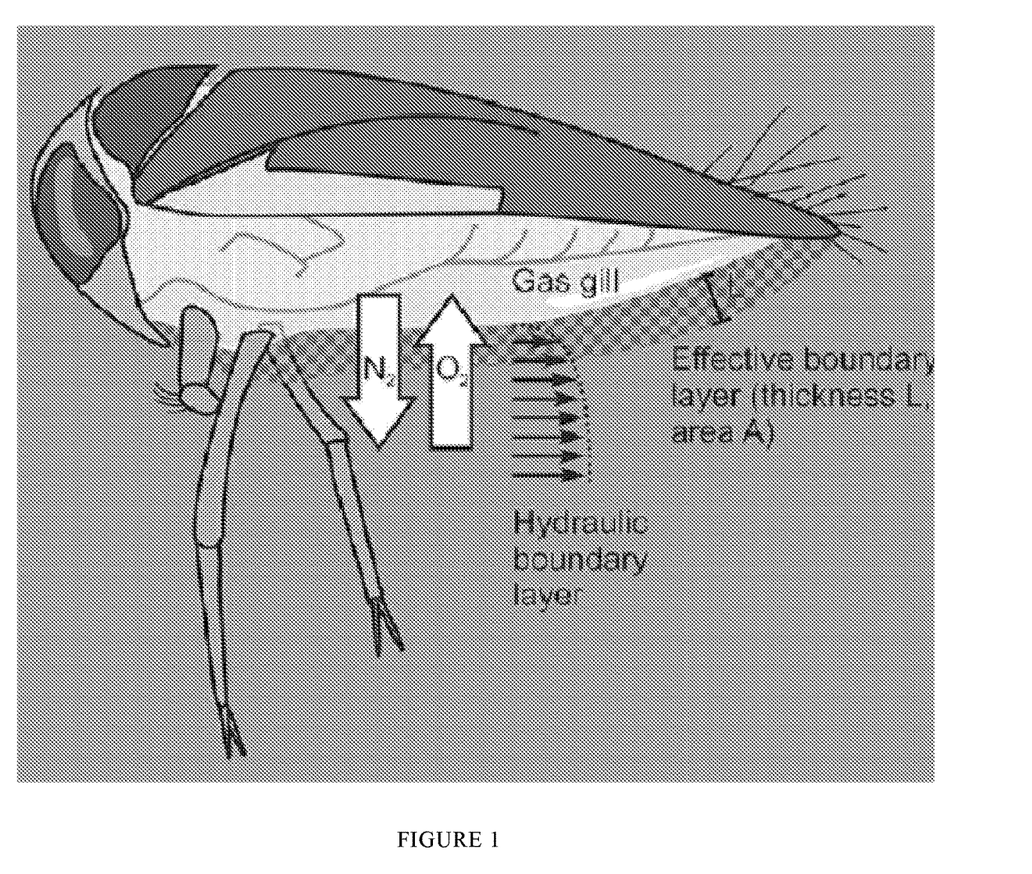
FIG. 1 shows a schematic of plastron respiration in a subaquatic insect.

Nitrogen in the thin layer of air may also diffuse out of the thin layer of air through the superhydrophobic layer and dissolve in the surrounding water. However, there is very little dissolved nitrogen present in water, so the partial pressure deficit caused by the movement of nitrogen from the thin layer of air to the surrounding water is compensated for by increased oxygen movement from the surrounding water to the thin layer of air through the superhydrophobic layer. This is illustrated in detail in FIG. 1 ("Physical gills in diving insects and spiders: theory and experiment", R. S. Seymour, P. G. D. Matthews, Journal of Experimental Biology 2013 216: 164-170). The effective boundary layer illustrates an imaginary layer of stagnant (i.e., not flowing) water having a thickness L and a surface area A necessary to achieve the required gas exchange for the insect by diffusion only. The hydraulic boundary layer illustrates the distribution of flow velocity of water surrounding the superhydrophobic layer, which decreases with decreasing distance from the outer surface of the thin layer of air.

SUMMARY

According to a first aspect of the invention, there is provided an artificial gill garment for providing oxygen to a wearer in an underwater environment. The artificial gill garment comprises a membrane configured to allow permeation of air through the membrane and prevent permeation of water through the membrane. The membrane may be configured to provide an air reservoir.

The membrane may be configured to provide an air reservoir directly between the membrane and the wearer, e.g. a single layer over the wearer's skin. Alternatively, the membrane may be configured to provide an air reservoir between a plurality of surfaces of the membrane. For example, the membrane may provide or enclose the air reservoir between layers or surfaces thereof. The membrane may effectively, in use, provide a closed container or reservoir for air.

By providing an air reservoir within the artificial gill garment for the user to breathe from, and the garment having a membrane that is configured to allow air permeation without water permeation, the artificial gill garment may enable the wearer to breathe underwater for an extended or indefinite period of time. Permeation of air through the membrane of the garment may enable oxygen gas dissolved in the surrounding water to permeate through the membrane to provide oxygen for the wearer to breathe. Simultaneously, the membrane may enable exhaled carbon dioxide to pass through the membrane and dissolve into the surrounding water. In this way, an optimal breathing environment may be maintained within the garment.

The artificial gill garment may therefore enable a wearer to stay submerged in water for longer than typically achievable during a free dive (i.e., diving with no equipment with the diver holding his or her breath), without requiring the heavy and bulky equipment typically required for scuba diving or deep-sea diving. The wearer may also be able to swim at a depth equal to or deeper than a depth typically achievable during snorkeling without risk of water flowing into the snorkeling mask via the breathing tube, again without heavy additional equipment required for breathing oxygen.

The membrane may comprise a mask portion in fluid communication with the air reservoir and configured to fit over at least facial respiratory features of the wearer. The mask portion may be or comprise a hollow or shell formed to fit or seal against a wearer's face. The seal may be similar to known snorkel/diving mask seals—a flexible material such as rubber or silicone. The membrane may be attached or attachable to the mask portion. The membrane may be further configured to be located over or to fit over at least a part of the wearer's body, e.g. a part or whole of a torso of the wearer, and/or a part or whole of one or more limbs of the wearer. The surface area of the garment may be altered depending on the breathing requirements of the wearer. The garment may also be altered depending on personal preference of the wearer for a garment with, for example, long or short sleeves or legs.

The mask portion may be formed of or comprise a plastic or polymer material, for example acrylonitrile butadiene styrene (ABS) or polycarbonate, or any other suitable underwater mask material. The mask portion may be rigid, semi-rigid or flexible in full or in part. The mask portion may comprise a flexible or sealing material around its edge to form a fluid-tight seal when used by a wearer.

The membrane may be formed of or comprise a flexible material. The flexible material may allow unconstrained natural movement of the wearer, both in water and on land. Comfort of the wearer may therefore be improved in situations where the wearer may be making multiple dives in a short space of time.

The membrane may be or comprises a porous hydrophobic or superhydrophobic material. The porous hydrophobic or superhydrophobic material may comprise at least one of porous thermoplastic polyurethane, polydimethylsiloxane, polybutadiene, polyester, neoprene or other polymerized materials or plastics. The porous hydrophobic material may comprise a porosity of between from 20% to 80% by volume.

Polydimethylsiloxane may be a useful membrane material for garments intended for deep dives because it has a high resistance to tearing.

The porous thermoplastic polyurethane may comprise a porosity of between 20% to 80% by volume. For example, a higher porosity results in a higher rate of gas exchange, allowing the garment to be used in shallow water where the likelihood of water permeation through the membrane is low due to low water pressure. A garment comprising a material which has an easily controllable porosity may allow different garments to be produced having a wide range of different porosities for a wide range of underwater applications.

The hydrophobic material may allow the wearer to stay dry e.g. on land. In an embodiment, a portion of a body of the wearer which is enclosed within the garment may remain dry in water, since the garment comprises a membrane which is impermeable to water. The garment may also remain dry when the wearer is on land, as water on a surface of the garment will be repelled by the hydrophobic material. Increased weight of the garment due to water retention is negated, in contrast to many typical free diving or scuba diving garments. Comfort of the wearer may therefore be improved (i.e., in comparison to conventional diving apparatus and/or garments such as wetsuits) in situations where the wearer may be making multiple dives in a short space of time.

The porous hydrophobic material may comprise a hydrophobic coating. The hydrophobic coating may comprise a fluoro-alkyl based polymer hydrophobic coating. The fluoro-alkyl based polymer hydrophobic coating may be or comprise perfluoropolyether, perfluoroalkoxy polymer, perfluorinated elastomer, polytetrafluoroethylene, perfluorosulfonic acid, polyhalogenated hydrocarbon polymer, polypropylene, and/or polytetrafluoroethylene.

The membrane or an outer surface of the membrane may comprise a surface pattern and/or a surface shape or configuration to increase a surface area of the outer surface. Increasing the surface area of the garment may enable more efficient permeation of oxygen and carbon dioxide through the membrane. Breathing demands of the wearer may therefore be met more efficiently by providing a sufficient volume of fresh oxygen (and removing a sufficient volume of exhaled carbon dioxide) at a sufficient rate to enable the wearer to breathe properly while underwater.

An increased surface area may be provided by one or more undulations, creases, pockets, folds, pleats etc. in the outer surface. The material of the membrane or of the outer surface of the membrane may be chosen to withstand a particular water pressure corresponding to a particular depth of dive.

The artificial gill garment may comprise a rebreather. The rebreather may be configured to extract carbon dioxide from breath of the wearer exhaled to the air reservoir. The rebreather may be configured to enable rebreathing of unused oxygen of the exhaled breath of the wearer. The rebreather may be used to enable the garment to meet breathing demands of the wearer if a surface area of the garment is not large enough to provide sufficient oxygen for the wearer to breathe without additional oxygen supply, or if oxygen in the air space has been used up e.g., on a long dive.

The artificial gill garment may comprise an oxygen tank configured to store oxygen and supply oxygen to the air reservoir. The oxygen tank may be used to enable the garment to meet breathing demands of the wearer if a surface area of the garment is not large enough to provide sufficient oxygen for the wearer to breathe without additional oxygen supply. The artificial gill garment may provide a proportion of the oxygen (e.g., between from 10% to 100%) required for the wearer to breathe, and the oxygen tank may provide the remaining oxygen (e.g., between from 90% to 0%) if necessary, depending on the gas permeability characteristics of the artificial gill garment. In this way, the oxygen tank may have a smaller volume than an oxygen tank typically used for scuba or deep-sea diving.

According to a second aspect of the invention, there is provided a method of manufacturing a membrane and/or an artificial gill garment. The method of manufacturing may be used to manufacture the membrane and/or artificial gill garment of the first aspect. The method may comprise three-dimensional printing of the artificial gill garment in a desired garment shape, the printed garment being air permeable and water impermeable. The three-dimensional printing may utilize additive manufacturing techniques. The method may comprise three-dimensional printing of a filament into the desired garment shape, powder based three-dimensional printing and/or liquid or paste-based three-dimensional printing. Alternatively the garment may be casted. The method may be used to manufacture an artificial gill garment in accordance with the first aspect of the invention.

Three-dimensional printing of the garment may allow complex shapes to be designed and produced that may be more difficult or impossible to produce using other manufacturing methods. In particular, three-dimensional printing may allow garments to be produced having complexly shaped outer surfaces in order to increase a surface area of the outer surface. Single-piece garments may also be produced using three-dimensional printing, which may reduce or eliminate a risk of water ingress into a space between the garment and the wearer at joining locations of multi-piece garments while underwater.

The method may comprise forming one or more air permeable and water impermeable regions in the printed garment. The one or more air permeable and water impermeable regions may be formed, for example by using three-dimensional printing to produce pores.

The filament may comprise a composite filament of a hydrophobic material and a hydrophilic material. The hydrophobic material may be or comprise a hydrophobic elastomeric polymer. The hydrophilic material may comprise hydrophilic particles. The hydrophobic elastomeric polymer may comprise at least one of thermoplastic polyurethane, polybutadiene, polydimethylsiloxane, neoprene, polyester and/or any other polymerized plastic or material. The hydrophilic particles may comprise at least one of polyvinyl alcohol, crystalline salt and polyglycolic acid. The method may further comprise washing the printed garment in water to remove the hydrophilic material from the printed garment.

By utilising a filament comprising a composite of a hydrophobic material and a hydrophilic material for three-dimensional printing, a porosity of the printed garment can be easily and finely controlled by varying the composition of the filament. Therefore, a wide range of garments suitable for different underwater applications may be manufactured. The malleability of the material advantageously provides for manufacturing a watertight "container" type garment.

The filament may be or comprise a composite filament of thermoplastic polyurethane and polyvinyl alcohol. The ratio of thermoplastic polyurethane to polyvinyl alcohol by weight in the composite filament may be between from 20:80 to 80:20. The ratio of thermoplastic polyurethane to polyvinyl alcohol by weight in the composite filament may be between from 30:70 to 70:30, and may be between from 40:60 to 60:40.

The method may further comprise coating the printed garment with a hydrophobic or superhydrophobic coating. The method may further comprise coating the printed garment with a fluoro-alkyl based polymer hydrophobic coating. The fluoro-alkyl based polymer hydrophobic coating may be or comprise any one or more of perfluoropolyether, perfluoroalkoxy polymer, perfluorinated elastomer, polytetrafluoroethylene or perfluorosulfonic acid.

The hydrophobic coating may allow the wearer to stay dry e.g. on land. A portion of a body of the wearer which is enclosed within the garment may remain dry in water, since the garment comprises a membrane which is impermeable to water. The garment may also remain dry when the wearer is on land, as water on a surface of the garment will be repelled by the hydrophobic coating. Increased weight of the garment due to water retention is negated, in contrast to many typical free diving or scuba diving garments. Comfort of the wearer may therefore be improved in situations where the wearer may be making multiple dives in a short space of time.

According to a third aspect of the invention, there is provided a precursor material composition for making a gas permeable waterproof membrane, the composition comprising a mixture of a hydrophobic material and a hydrophilic material. The precursor material composition may be used in or to make the artificial garment of the first aspect of the invention, and may be used in the method of the second aspect of the invention.

The hydrophobic material may be or comprise a hydrophobic elastomeric polymer. The hydrophilic material may be or comprise hydrophilic particles. The hydrophobic elastomeric polymer may comprise at least one of thermoplastic polyurethane, polybutadiene, polydimethylsiloxane, neoprene, polyester and/or any other polymerized plastic or material. The hydrophilic particles may comprise at least one of polyvinyl alcohol, crystalline salt and polyglycolic acid. The mixture may comprise thermoplastic polyurethane and polyvinyl alcohol in a ratio of thermoplastic polyurethane to polyvinyl alcohol by weight of between from 20:80 to 80:20. The ratio of thermoplastic polyurethane to polyvinyl alcohol by weight in the mixture may be between from 30:70 to 70:30, and may be between from 40:60 to 60:40.

According to a fourth aspect of the invention, there is provided a gas permeable waterproof membrane made using the precursor material composition of the third aspect of the invention. The gas permeable waterproof membrane may be the gas permeable waterproof membrane of the first aspect.

According to a fifth aspect of the invention, there is provided a method of manufacturing a gas permeable waterproof membrane. The gas permeable waterproof membrane may be the gas permeable waterproof membrane of the first or fourth aspect. The method comprises producing a mixture of a hydrophobic material and a hydrophilic material. The method further comprises forming a membrane from the mixture of the hydrophobic material and the hydrophilic material. The method also comprises creating pores in the membrane by washing the membrane in water to remove the hydrophilic material from the membrane. The method may be used to make the artificial gill garment of the first aspect of the invention.

The method may further comprise treating a surface of the membrane to impart hydrophobic properties to the surface of the membrane.

Treating the surface of the membrane may comprise coating the surface of the membrane in a hydrophobic coating. The hydrophobic coating may comprise a fluoro-alkyl based polymer hydrophobic coting. Alternatively, treating the surface of the membrane may comprise altering a surface chemistry of the surface of the membrane by reacting one or more substances with material on the surface of the membrane.

The hydrophobic material may be or comprise a hydrophobic elastomeric polymer. The hydrophilic material may be or comprise hydrophilic particles. The hydrophobic elastomeric polymer may be or comprise at least one of thermoplastic polyurethane, polybutadiene, polydimethylsiloxane, neoprene, polyester and/or any other polymerized plastic or material. The hydrophilic particles may be or comprise at least one of polyvinyl alcohol, crystalline salt and polyglycolic acid. The mixture may comprise thermoplastic polyurethane and polyvinyl alcohol in a ratio of thermoplastic polyurethane to polyvinyl alcohol by weight of between from 20:80 to 80:20. The ratio of thermoplastic polyurethane to polyvinyl alcohol by weight in the mixture may be between from 30:70 to 70:30, and may be between from 40:60 to 60:40.

In a sixth aspect there is provided a garment comprising a gas permeable waterproof membrane, the membrane produced by the method of any of the fifth aspect.

In a seventh aspect there is provided a building or structure comprising a gas permeable waterproof membrane, the membrane produced by the method of any of the fifth aspect.

In each of the first, second, fourth, fifth, sixth and seventh aspects of the invention, the pore size may be less than or equal to approximately 250 micrometers in all directions, and optionally may be less than or equal to approximately 100 micrometers in all directions. Such a pore size is optimal for balancing gas permeability with waterproofing provided by hydrophobic or superhydrophobic properties of the membrane. Porosity of the membrane may be between from 20% to 80%, and optionally between from 30% to 70%, and further optionally between from 40% to 60%. Porosity of the membrane may be tailored to suit a specific application. For example, shallow dives will experience a lower water pressure and so the membrane may have a higher porosity to provide gas permeability through the membrane.

Features which are described in the context of separate aspects and/or embodiments of the invention may be used together and/or be interchangeable. Similarly, where features are, for brevity, described in the context of a single embodiment or aspect, these may also be provided separately or in any suitable sub-combination. Features described in connection with the garment and/or membrane may have corresponding features definable with respect to a method, and vice versa, and these embodiments are specifically envisaged.

BRIEF DESCRIPTION OF THE DRAWINGS

The invention will now be described by way of example with reference to the accompanying drawings in which:

FIGS. 2A, 2B and 2C respectively show front, side and rear views of an artificial gill garment in accordance with an embodiment and 2D, 2E and 2F respectively show front, side and rear views of an artificial gill garment in accordance with another embodiment;

FIGS. 5A to 5E show various components of an experimental setup to investigate gas exchange properties of a porous superhydrophobic membrane in accordance with the present disclosure;

Features which are described in the context of separate aspects and embodiments of the invention may be used together and/or be interchangeable wherever possible. Similarly, where features are, for brevity, described in the context of a single embodiment, these may also be provided separately or in any suitable sub-combination. Features described in connection with the artificial gill garment may have corresponding features definable with respect to the methods of manufacture or the material composition, and these embodiments are specifically envisaged.

DETAILED DESCRIPTION

FIGS. 2A-2F show an artificial gill garment 100 in accordance with an embodiment of the invention. The garment 100 is designed to be worn by a wearer, and is configured to support underwater respiration and provide a comfortable garment both in and out of the water. For example, the garment 100 may be particularly suitable for individuals who make frequent shallow dives as part of their daily life. The garment may not need to be removed after each dive, and can be worn on land as well as in water.

The garment 100 comprises a mask portion 105 and a membrane or body portion 110. The mask portion 105 is configured to fit over facial respiratory features (i.e., a mouth and/or a nose) of the wearer. The body portion 110 is configured to fit over at least a torso of the wearer. In some instances, the body portion may be configured to fit over a torso and one or more limbs (i.e., arms and/or legs) of the wearer. In other instances, the body portion 110 may be configured to fit over a smaller proportion of the body of the wearer than the torso and limbs of the wearer, for example over the shoulders and upper torso of the wearer. In other examples, the garment may be configured to fit over the entire head of the wearer, and/or may not comprise a body portion.

In an embodiment, the garment 100 may be manufactured to ensure secure fitting around the wearer at one or more potential points of water ingress. For example, the garment 100 may be manufactured to ensure secure fitting around the face and optionally also the shoulders, elbows, wrists or other points of an arm of the wearer, depending on a length of any arms of the garment. Similarly, the garment may be manufactured to ensure secure fitting around a waist, thighs, calves, ankles or other points of a leg of the wearer, depending on a length of any legs of the garment. The garment 100 is manufactured to ensure secure fitting around a neck and face of the wearer, e.g. by fitting or sealing the mask to or around a wearer's face or head. The garment 100 may be configured to fit securely around the wearer at potential points of water ingress by manufacturing relevant portions of the garment such that the wearer must stretch the garment over himself or herself at such potential points of water ingress when putting the garment on. Elastic deformation of the garment at such portions of the garment may enable the wearer to put the garment on, but a subsequent elastic response of the garment causes the garment to constrict around the body of the wearer at the potential point of water ingress, ensuring that the garment forms a seal around the wearer.

Alternatively, the garment may comprise a seal configured to prevent water ingress at potential points of water ingress where a hole is formed to enable the wearer to put the garment on.

Figure 2:
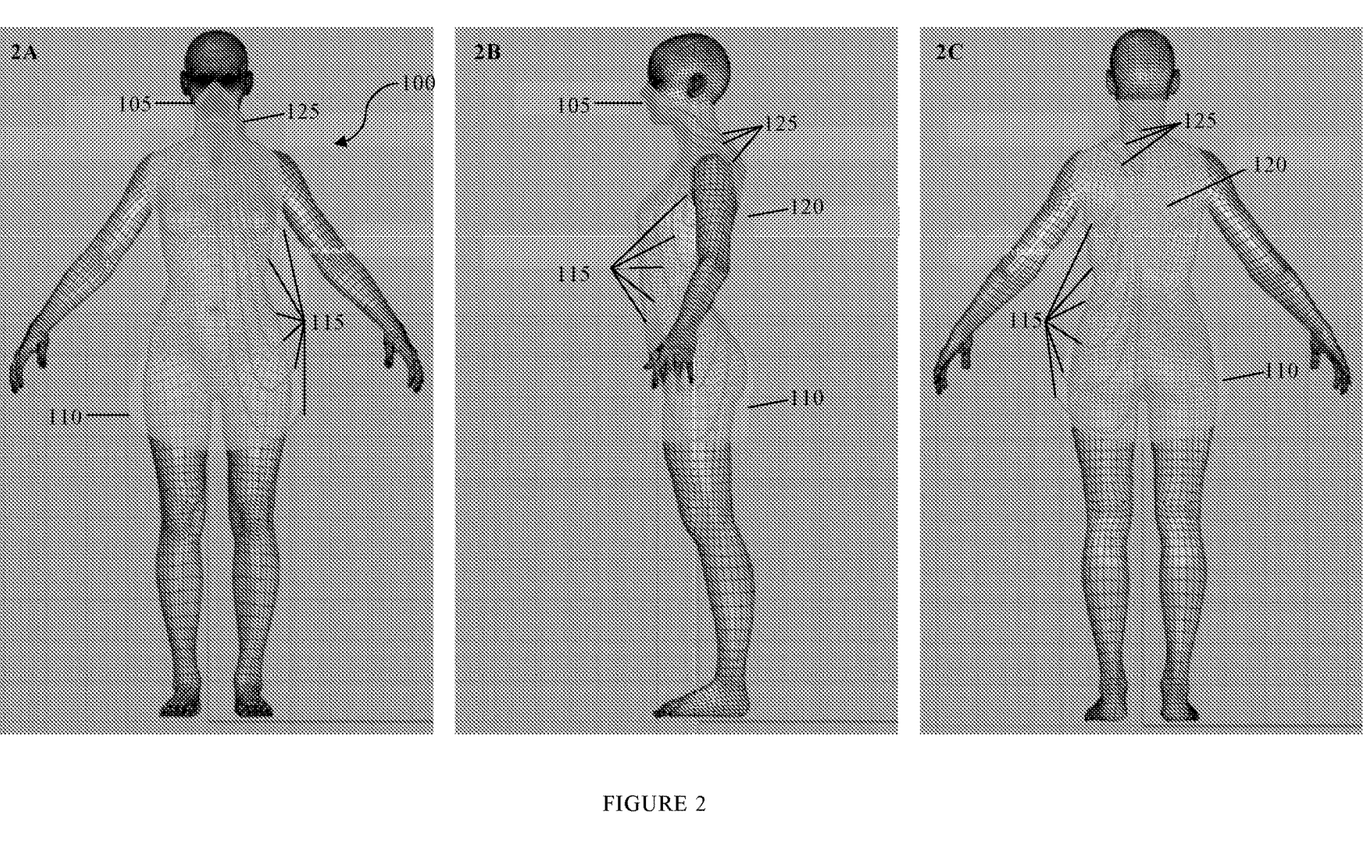

In an embodiment, shown in FIGS. 2A-2C, the mask portion 105 and the body portion 110 together are configured to form an air space between the garment 100 and the wearer. Air trapped between the garment 100 and the wearer circulates within the internal space between the wearer and the garment 100, enabling the wearer to breathe the air whilst wearing the garment 100 underwater. In this embodiment, the garment 100 comprises a single layer membrane configured to allow permeation of air through the membrane and prevent permeation of water through the membrane.

In a different embodiment, shown in FIGS. 2D-2F, an air reservoir 111 is provided between layers 100, 110' or surfaces of the body portion 110. For example, the reservoir 111 may be formed within a dual-layered membrane or within an envelope 110 (e.g. formed by looping or folding a membrane 110 over itself). The reservoir in this embodiment is depicted by the dotted lines 110, 110' in FIGS. 2D-2F.

Figure 3:
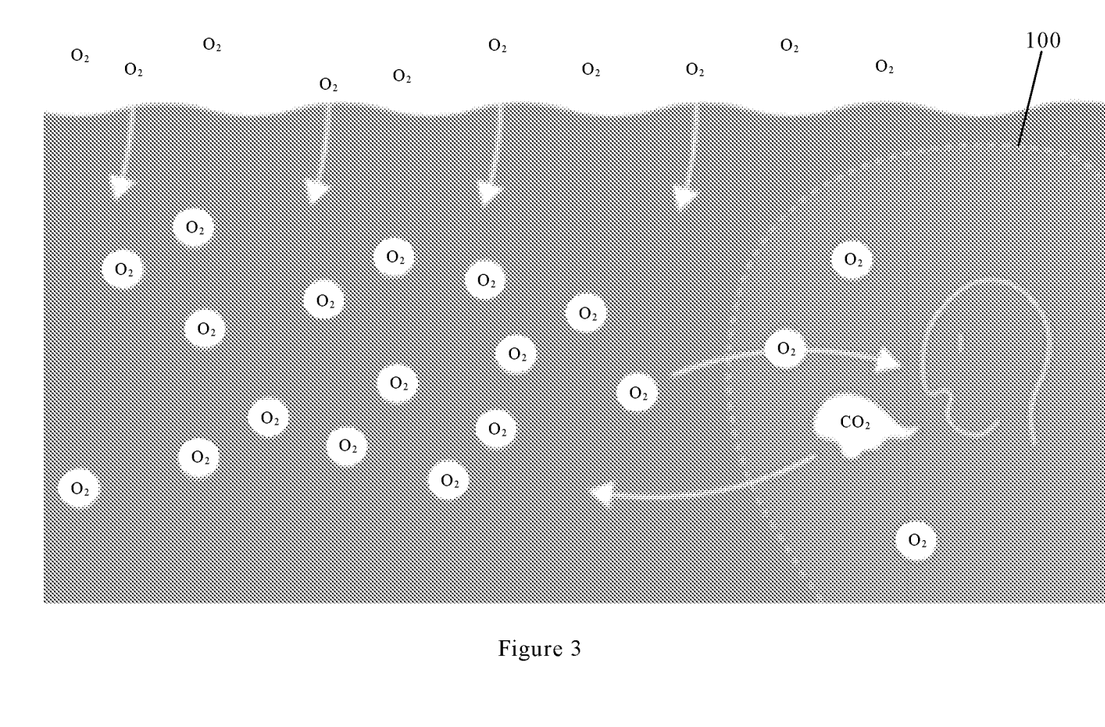
FIG. 3 shows a schematic of oxygen gas exchange and carbon dioxide gas exchange through an artificial gill garment in accordance with the present disclosure.

In either embodiment, the garment 100 is configured to replenish a supply of fresh oxygen for the wearer to breathe whilst wearing the garment 100 underwater. Any depletion in oxygen concentration in the air space between the garment 100 and the wearer or between layers of the garment, as a result of the wearer breathing, causes a concentration difference in oxygen between the air in the air reservoir and the surrounding water. This concentration difference acts as a driving force to force oxygen gas dissolved in the surrounding water to permeate through the membrane and enter the air reservoir between the garment 100 and the wearer or between the layers of the garment. Similarly, any build-up in carbon dioxide concentration in the air reservoir, as a result of the wearer breathing, causes a concentration difference in carbon dioxide between the air in the air reservoir and the surrounding water. This concentration difference acts as a driving force (according to Fick's first law of diffusion) to force carbon dioxide in the air reservoir to permeate through the membrane and dissolve into the surrounding water. In this way, the air composition in the air reservoir remains at an optimal composition for the wearer to breathe. This process is shown schematically in FIG. 3.

The membrane 110 (or 110, 110') is or comprises at least in part a flexible material to allow the wearer to move naturally whilst wearing the garment 100, both in water and on land. Alternatively, the membrane 110 (or 110, 110') may comprise a rigid material to accommodate, for example, increased water pressure at greater water depths, or to protect the wearer from rough underwater conditions or attack from ocean organisms. A garment comprising a rigid material may also be useful for, e.g., military applications.

The membrane 110 (or 110, 110') may comprise a porous hydrophobic or superhydrophobic material. The porous hydrophobic or superhydrophobic material may improve the impermeability of the membrane 110 (or 110, 110') to water whilst simultaneously allowing permeation of air through the membrane 110 (or 110, 110'). A hydrophobic or superhydrophobic material also allows the wearer to remain dry whilst wearing the garment 100 on land, since water will not be retained within the material or on the surface of the material. Non-retention of water by the garment 100 also means there is no change in weight of the garment 100 after use in water, which is a common problem in typical diving equipment. The garment 100 may also not require drying after use, and so is comfortable for the wearer to wear multiple times in rapid succession.

The porous hydrophobic or superhydrophobic material may comprise porous thermoplastic polyurethane (TPU). The porosity of the TPU may be between from 20% to 80% by volume.

The porous hydrophobic or superhydrophobic material may comprise a fluoro-alkyl based polymer coating. The fluoro-alkyl based polymer coating may comprise at least one of perfluoropolyether, perfluoroalkoxy polymer, perfluorinated elastomer, polytetrafluoroethylene and perfluorosulfonic acid. The fluoro-alkyl based polymer coating may provide hydrophobic or superhydrophobic properties to prevent permeation of water through the membrane 110 (or 110, 110').

Figures 4, 4B:
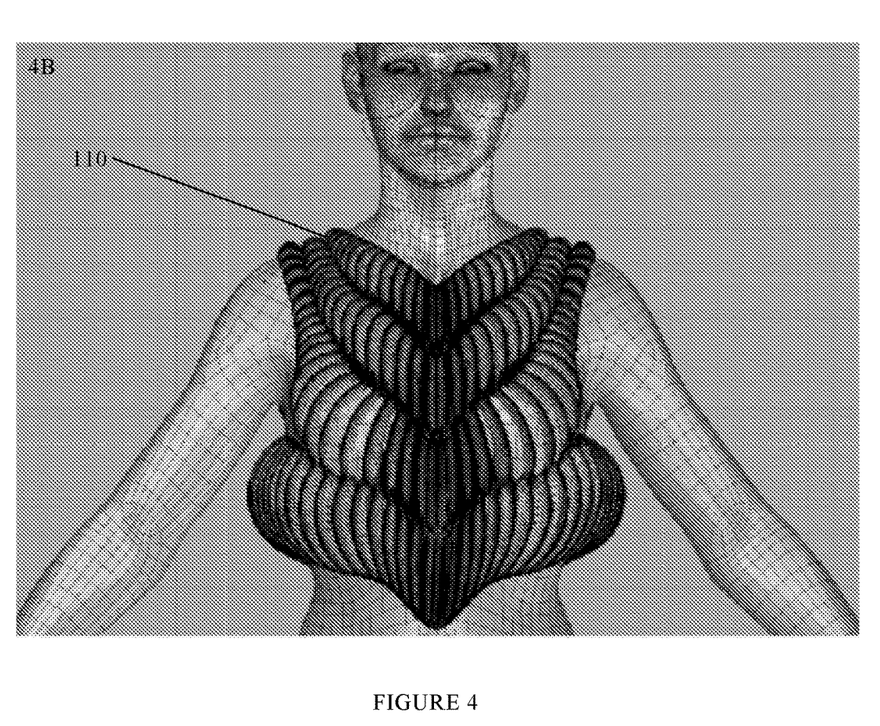
FIG. 4 shows a surface configuration of an artificial gill garment in accordance with the present disclosure.
Figure 4A:
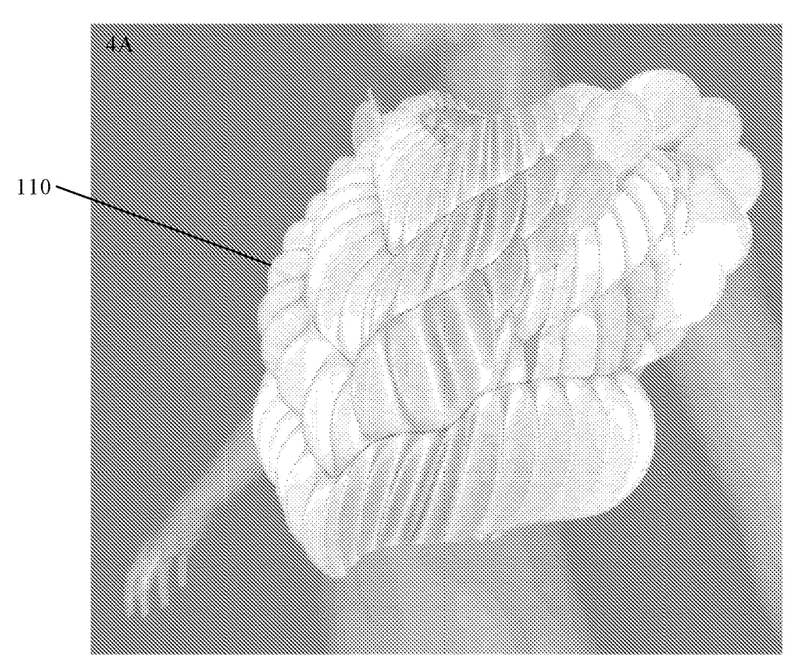

The membrane 110 (or 110, 110') has a surface or comprises an outer surface with a surface pattern and/or a surface shape or configuration configured to increase a surface area of the surface/outer surface. The surface pattern or surface shape may be an undulating surface comprising a plurality of raised bands (e.g., semi-cylindrical bands) on the outer surface of the garment 100, as shown in FIGS. 4A and 4B (showing only the body portion 110). Other surface patterns such as grooves and ridges, or dimples, may be used to increase the surface area of the outer surface of the garment. The surface pattern may be a microscopic pattern (e.g., comprising features having dimensions of less than 1000 micrometers). The microscopic pattern may be produced by surface machining of the garment. The larger the surface area of the outer surface of the garment 100, the more effective permeation of oxygen and carbon dioxide through the membrane (i.e., a higher rate of permeation) into and out of the air space between the garment and the wearer will be. This enables the garment 100 to replenish the supply of fresh oxygen to the wearer to meet the breathing demands of the wearer (i.e., by providing a sufficient volume of fresh oxygen to enable to wearer to breathe properly). The surface shape/configuration or surface pattern may also act to increase a volume of the air reservoir, as shown in FIGS. 3A and 3B. In the case of the semi-cylindrical raised bands as shown in FIGS. 3A and 3B, each of the raised bands may provide an additional pocket of air in the air reservoir.

The garment 100 shown in FIGS. 2A to 2F comprises a rebreather 120. The rebreather 120 is located on a rear side of the garment 100 with respect to the wearer, although the rebreather may be located at any position on the garment 100. The rebreather 120 extracts carbon dioxide from exhaled breath of the wearer to enable the wearer to utilise the unused oxygen in the exhaled breath, without also inhaling the previously exhaled carbon dioxide. Flow lines 115 indicate a direction of exhaled breath flow from a mouth or nose of the wearer to the rebreather 120. Exhaled breath may flow from the mask portion 105 of the garment 100 towards the body portion 110 of the garment 100 across a front side of the garment 100, before flowing around lateral sides of the garment 100 and across the rear side towards the rebreather 120. The exhaled breath may flow throughout the full air reservoir. Once the rebreather has extracted carbon dioxide from the exhaled breath, the rebreathable air may flow from the rebreather 120 towards the mask portion 105 of the garment 100 by flowing over the rear side of the body portion 110 around the neck and shoulders of the wearer, as shown by flow lines 125. Once the rebreathable air reaches the mask portion 105, the wearer can breathe the rebreathable air. The rebreather 120 is configured to work in conjunction with the membrane 110 (or 110, 110') to provide breathable air to the air reservoir.

Alternatively, the exhaled breath and/or the rebreathable air may not follow any well-defined flow patterns within the air reservoir, and may diffuse randomly within the air reservoir.

Alternatively or additionally, the garment 100 may comprise an oxygen tank (not shown). The oxygen tank may be configured to provide supplemental oxygen to the air reservoir to aid breathing of the wearer. The oxygen tank may be configured to provide supplemental oxygen in response to an oxygen concentration in the air reservoir falling below a pre-determined threshold. The oxygen concentration in the air reservoir may be measured by an oxygen sensor located in the air reservoir. The oxygen tank may be configured to work in conjunction with the membrane 110 (or 110, 110') that provides oxygen to the air reservoir, and/or with the rebreather.

Alternatively, the garment 100 may not comprise a rebreather or an oxygen tank. The garment 100 may comprise a large enough surface area to provide enough oxygen to the air reservoir by permeation of oxygen through the membrane 110 (or 110, 110') of the garment 100.

The garment 100 may be manufactured using a variety of manufacturing techniques. For example, the garment 100 may be produced using additive layer manufacturing techniques such as three-dimensional printing (3D printing). Producing the garment 100 using additive layer manufacturing techniques enables the manufacture of complex shapes with a high surface area and efficient air circulation within the air reservoir. Both features are desirable for efficient gas exchange (i.e., oxygen and carbon dioxide) into and out of the air reservoir to retain optimal breathing conditions for the wearer. By virtue of 3D printability, a desired shape of the garment 100 can be created using computational calculation and/or using parametric design. Alternatively, the garment 100 may be produced using a casting technique. A mould for the casting process may be designed to impart complex surface shapes or surface patterns giving the garment 100 a high surface area and efficient air circulation within the air reservoir.

The garment may be 3D printed using powder-based 3D printing. The garment may be 3D printed using liquid or paste-based three-dimensional printing. The garment 100 may be produced via 3D printing using a fused deposition modelling technique (i.e., a fused filament fabrication method). The filament may comprise a filament of a porous material or a non-porous material. The filament may comprise a mono-component or composite material. The filament may comprise a hydrophobic or superhydrophobic material.

The filament may comprise a composite filament of a hydrophobic material and a hydrophilic material. The hydrophobic material may be or comprise a hydrophobic elastomeric polymer. The hydrophilic material may be or comprise hydrophilic particles. The hydrophobic elastomeric polymer may comprise at least one of thermoplastic polyurethane, polybutadiene and polydimethylsiloxane, although other hydrophobic elastomeric polymer materials may be used. The hydrophilic particles may comprise at least one of polyvinyl alcohol, crystalline salt and polyglycolic acid, although other hydrophilic particulate materials may be used. The filament may comprise a composite filament of thermoplastic polyurethane (TPU) and polyvinyl alcohol (PVOH). The ratio of TPU:PVOH in the composite filament may be between approximately 20:80 and 80:20 by weight. Alternatively, the ratio of TPU:PVOH in the composite filament may be between approximately 30:70 and 70:30 by weight, or between approximately 40:60 and 60:40 by weight. The initial composition of the composite TPU and PVOH filament determines an eventual porosity of the membrane of the garment 100 (discussed below). Pore size produced using a composite filament of TPU and PVOH is dictated by the particle size of PVOH particles used in the composite filament. The particle size of PVOH particles used in the composite filament is preferable between from 1 to 100 micrometers, depending on the desired pore size (as greater pore size results in greater permeability). The particle size of TPU particles used in the composite filament may be substantially equal to the particle size of PVOH particles used in the composite filament. The particle size of TPU particles used in the composite filament may be between from 1 to 50 micrometers.

The filament is then used to form a garment 100 using a 3D printing technique. An advantage of 3D printing over casting is that a single-piece garment can be produced more easily without the need for any further processing steps to join two or more separate parts (i.e., via stitching or otherwise adhering) to form the full garment (as may be the case with casting). Such post-part-production joinery of separate components of garment may reduce the ability of the garment 100 to prevent water ingress into the air space between the garment 100 and the wearer if not joined correctly.

The material compositions as described above with respect to 3D printing of an artificial gill garment may also be used for casting an artificial gill garment.

For non-porous filament materials or casting materials, a further processing step such as washing or etching may be required to produce a garment 100 with a porous membrane 110 (or 110, 110') to enable gas permeation through the membrane 110 (or 110, 110') of the garment 100. For example, if the filament used for 3D printing of the garment 100 is a composite filament of a hydrophobic elastomeric polymer and hydrophilic particles, the garment 100 may be washed in distilled water, or a mixture of distilled water and ethanol, to remove the hydrophilic particles from the garment 100. By removing the hydrophilic particles from the garment 100, a porous garment 100 is produced. The composition of the composite hydrophobic elastomeric polymer: hydrophilic particles filament used in 3D printing determines the final porosity of the membrane of the garment 100. For example, a composite TPU:PVOH filament with a greater proportion by weight of TPU will have a lower final porosity after washing than a composite TPU:PVOH filament with a lower proportion by weight of TPU. As the densities of both TPU and PVOH are similar, the porosity of the obtained material therefore ranges between from 80% to 20% by volume respectively. The obtained pore size is dependent on the particle size of PVOH particles used in the composite filament. Hence, the pore size can be controlled between from 1 to 100 micrometers. After washing, the garment 100 is left to dry in an ambient environment.

In some instances, porosity of the garment 100 may be introduced during production of the garment using 3D printing. For example, pores may be introduced into the garment 100 by constructing features in the garment during 3D printing. As described above, the pore size in the garment 100 may be less than or approximately equal to 100 micrometers. Thus, a 3D printing machine may introduce porosity into the garment 100 by constructing pores having dimensions of approximately 100 micrometers or less in all directions (e.g., a diameter of approximately 100 micrometers or less). In some instances, hydrophobic or superhydrophobic properties may be imparted to the garment by producing small scale (i.e., micrometer length scale) surface patterning on an outer surface of the garment 100 during 3D printing.

Gas permeability (i.e., a gas exchange ratio) of the membrane of the garment 100 in water varies dependent on a thickness of the membrane and a porosity of the membrane 110 (or 110, 110'). In the case of a composite TPU:PVOH filament used for 3D printing of the garment 100, the initial composition of the TPU:PVOH dictates the porosity of the membrane 110 (or 110, 110') of the garment 100. Gas permeability is proportional to porosity and inversely proportional to membrane thickness. Therefore, a thinner membrane 110 (or 110, 110') with a higher porosity will have greater gas permeability than a thicker membrane with a lower porosity. However, a thicker membrane with a lower porosity will have a lower gas permeability under higher water pressures than a thinner membrane with a higher porosity.

For non-hydrophobic or non-superhydrophobic filament materials or casting materials, a further processing step may be required to produce a garment 100 with hydrophobic or superhydrophobic properties. The garment 100 may be processed by altering the surface chemistry of the garment to produce a hydrophobic of superhydrophobic surface. The garment 100 may be coated with a hydrophobic or superhydrophobic coating, or may be exposed to substances which react with the material of the printed garment to form an outer surface of the garment 100 having hydrophobic or superhydrophobic properties. For example, if the filament used for 3D printing of the garment 100 is a composite filament of TPU:PVOH, the garment 100 may be coated with a fluoro-alkyl based polymer coating to provide an outer surface of the garment 100 with hydrophobic or superhydrophobic properties. The coating may have a thickness of between from 0.25 to 2 micrometers, and optionally between from 0.5 to 1 micrometers.

The filament material used in 3D printing of the garment 100 may also be selected based on mechanical properties required for the garment 100. For example, if the garment 100 is required to enable unrestrained natural movement of the wearer, a filament comprising a flexible material may be used for 3D printing of the garment 100. If the garment 100 is required to provide the wearer with protection from rough underwater conditions, attack from ocean organisms, or needs to withstand increased water pressure at greater water depths, a filament comprising a semi-rigid or stiff material may be used for 3D printing of the garment 100.

Manufacturing an artificial gill garment 100 in accordance with the methods described above enables the production of a water repellent, gas permeable garment with mechanical properties (i.e., flexibility, rigidity, strength, toughness) as desired for the application of the artificial gill garment.

Gas permeable waterproof membranes (not necessarily for use in artificial gill garments) may be manufactured utilising similar methods to those described above with respect to an artificial gill garment. For example, a precursor material composition for making a gas permeable waterproof membrane may be produced by producing a mixture of a hydrophobic elastomeric polymer (e.g., TPU) and hydrophilic particles (e.g., PVOH). A membrane may then be formed from the mixture of the hydrophobic elastomeric polymer and the hydrophilic particles. The membrane may be formed, for example, by 3D printing or by casting, or other suitable manufacturing techniques Pores may be created in the membrane by washing the membrane in distilled water to remove the hydrophilic particles from the membrane.

The surface of the membrane may also be treated to impart hydrophobic or superhydrophobic properties to the surface of the membrane.

In some instances, a part manufactured from the precursor material composition may be distributed to a third party prior to the washing or coating step. In this way, the process of producing the gas permeable waterproof membrane or part need not be manufactured at a single location or by a single manufacturer.

Gas permeable waterproof membranes such as those manufactured in the manner described above may be utilised in underwater structures or buildings. For example, rather than an artificial gill garment, a building comprising an underwater air space may be created within a space enclosed by a gas permeable waterproof membrane. One or more persons may be able to breathe within the air space enclosed by the gas permeable waterproof membrane. The gas permeable waterproof membranes may also be used to filter noxious gases dissolved in water. 3D printing may allow filters to be produced having a complex shape or form to be used in environments or locations that are otherwise difficult to access using standard filter types and/or shapes. Other uses may include water repellent clothing garments with high gas permeability for extreme sports.

An experimental setup as shown in FIG. 5 was used to measure gas exchange properties of a porous superhydrophobic material. A first aperture 205 in a tank 200 (shown from below) was covered with a porous superhydrophobic membrane 210, a fluid-tight seal being formed between the porous superhydrophobic membrane 210 and the edge of the first aperture 205. This is shown in more detail in FIG. 5A. The porous superhydrophobic membrane 210 formed the only path through which gas could be exchanged in and out of the tank 200. The porous superhydrophobic membrane was a polytetrafluoroethylene membrane having a thickness of 5 mm and a porosity of 77%. A droplet of water on the porous superhydrophobic membrane 210, as shown in FIG. 5B, illustrates that water is not able to pass through the membrane 210. An oxygen sensor 215 was also placed in the tank 200. A tube 225 for introducing carbon dioxide gas into the tank 200 was passed through a second aperture in the tank 200, a fluid-tight seal being formed between the tube 225 and the edge of the second aperture 220. This is shown in more detail in FIG. 5C.

The fully sealed tank 200 was then completely submerged in oxygenated water and kept underwater for the duration of the test, as shown in FIGS. 5D and 5E. After submersion into the oxygenated water, carbon dioxide gas was introduced to the sealed tank 200 through the tube 225 passed through the second aperture 220 to reduce oxygen concentration in the tank 200.

Oxygen concentration in the sealed tank 200 was reduced to 9% by volume after introduction of the carbon dioxide gas to the tank 200. After 12 hours submerged in oxygenated water, the oxygen concentration in the sealed tank 200 (as measured by the oxygen sensor 215 in the sealed tank 200) increased to 20.1%. These results indicate the viability of using a porous superhydrophobic material in an artificial gill garment.

Further testing was carried out in a seawater environment. The environmental conditions were less controllable than the laboratory based testing (i.e., laboratory based testing took place in a well-ventilated room with well-aerated water). The same experimental setup as shown in FIG. 5 was used, with the sealed tank 200 instead being submerged in seawater instead of oxygenated water. To make sure that the membrane 210 remained fully submerged in the seawater, the tank 200 was secured to a nearby rock or rope.

The oxygen concentration in the sealed tank 200 was reduced to 14.22% by volume and the membrane 210 was left submerged in seawater for approximately 1 hour. The oxygen concentration in the tank 200 was reduced in this case by breathing the air in the tank through the tube 225.

Figure 6:
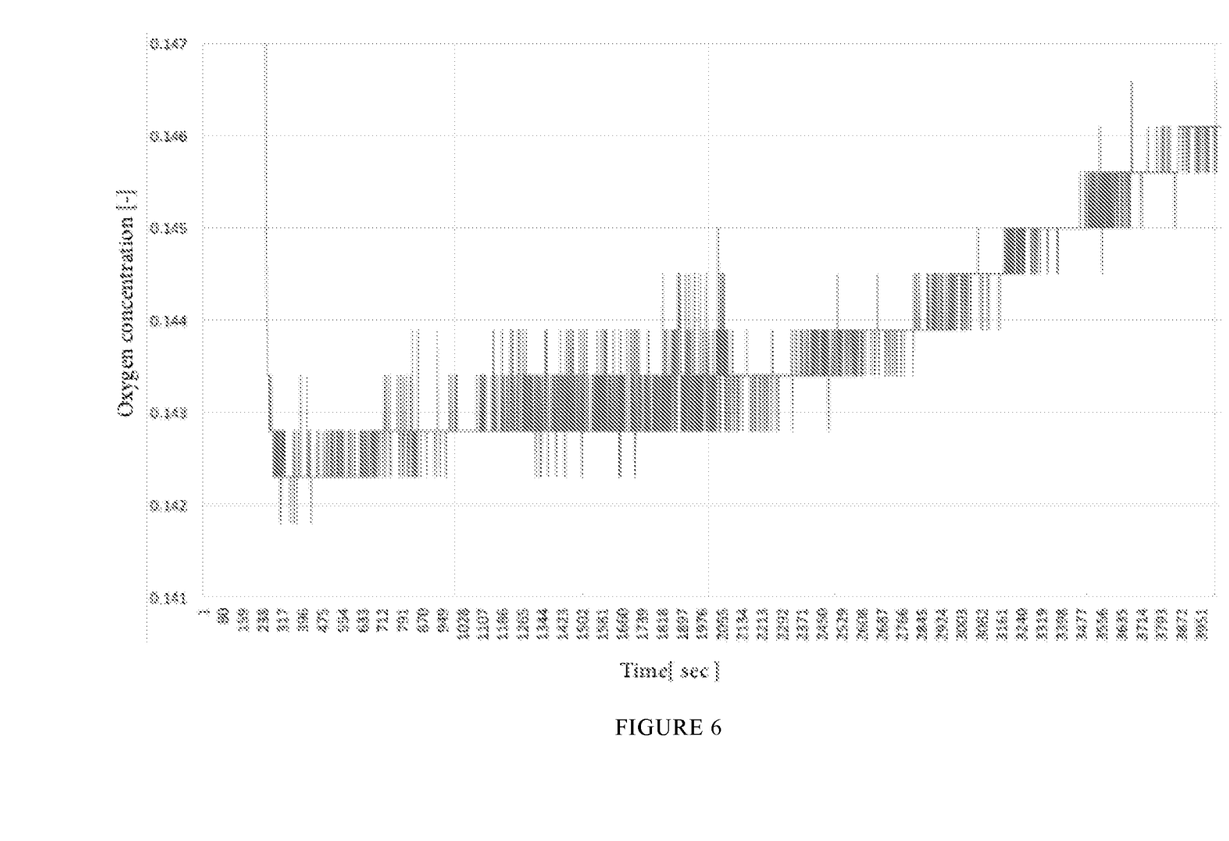
FIG. 6 shows a plot of oxygen concentration as a function of time for the experiment conducted using the experimental setup of FIG. 5.

FIG. 6 shows the results obtained from the testing in the seawater environment described above. A plot of oxygen concentration in the sealed tank 200 as a function of time is shown in FIG. 6. The trend of the plot shows an increase in oxygen concentration in the tank 200 over time, corroborating the results obtained from laboratory based testing. Clearly, the porous superhydrophobic membrane 210 is able to exchange oxygen gas and carbon dioxide gas between the sealed tank 200 and the environment surrounding the sealed tank 200.

The surface area of the tested membrane 210 was 6 cm$^2$. The change in oxygen concentration in the tank 200 over the testing time period in the seawater testing was approximately 0.5% per hour. The tank 200 had a volume of 565 mL, resulting in an oxygen replenishment rate of 0.075 mL/(hr·cm$^2$) through the membrane 210. The average rate of oxygen consumption for a human is 14400 mL/hour.

From the above, it can be calculated that the required surface area for supporting human breathing is approximately 19.2 m$^2$. The surface area of a garment made from such a membrane can be increased by utilising surface patterning and/or a surface shape or configuration as described above. Some garments may not have the required amount of surface area. For example, the garment may only cover a torso and facial respiratory features of the wearer, and cannot make use of the additional surface area that would be available if the garment were to also cover one or more limbs of the user. In such cases, the garment may be used in conjunction with a rebreather and/or an oxygen tank (as described above) in order to provide optimal breathing conditions for the wearer.

Figure 7:
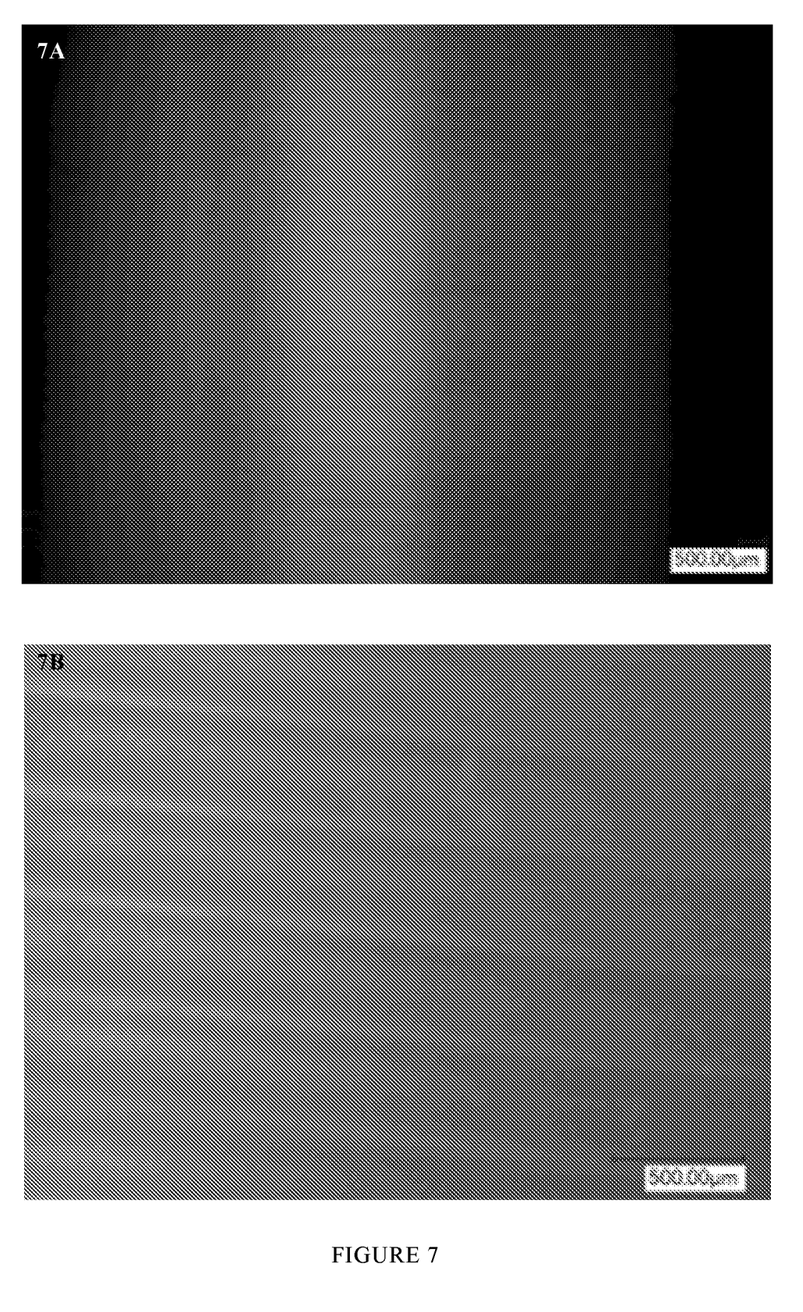
FIGS. 7A and 7B shows optical micrographs of a porous membrane in accordance with the present disclosure.

FIG. 7 shows optical microscopy images of a surface of a 3D printed part fabricated by 3D printing a composite filament of TPU and PVOH. FIG. 7A shows an optical micrograph at a lower magnification than the magnification used for the optical micrograph shown in FIG. 7B. A scale bar is shown in the bottom right hand corner of each of the micrographs. The images were captured after the 3D printed part has been washed in a mixture of distilled water and ethanol, but before the part had been coated with a hydrophobic coating. The images in FIG. 7A show good adhesion of adjacent layers to achieve tight sealing of the 3D printed part. No fracture or debonding between adjacent layers was observed in the 3D printed garment, even after cooling, indicating that the layers are bonded together well. In this way, permeation of water is prevented through any poorly adhered layers, allowing a 3D printed garment formed as described above to enclose an air space between the garment and the wearer.

Figure 8:
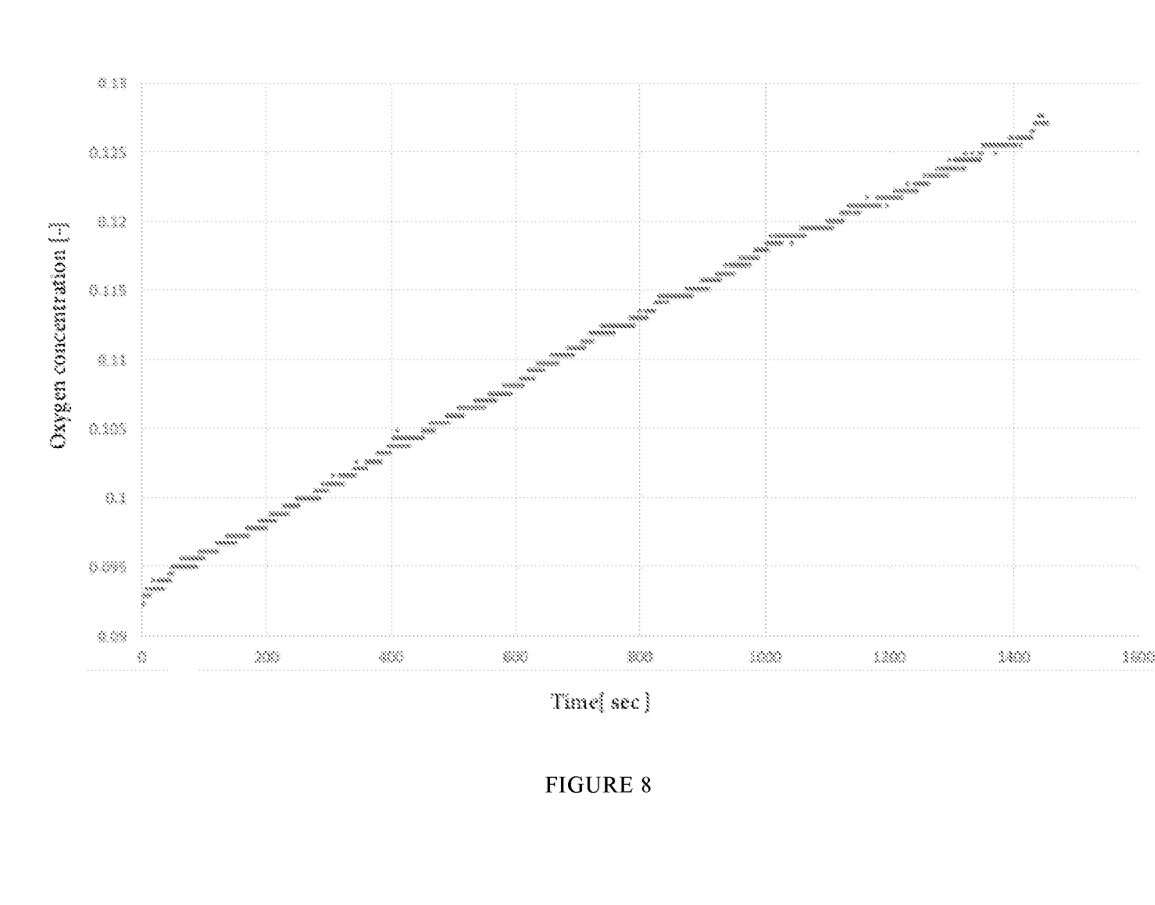
FIG. 8 shows a plot of oxygen concentration as a function of time for the experiment conducting using the experimental setup of FIG. 5 conducted on the porous membrane shown in FIGS. 7A and 7B.

FIG. 8 shows a plot of oxygen concentration in a sealed tank as a function of time. The experimental setup used to obtain the results shown in FIG. 8 was identical to the experimental setup described with respect to FIGS. 5 and 6, except that the porous superhydrophobic membrane was a membrane of TPU with a porosity of 50% (manufactured starting from an initial TPU:PVOH composition of 50:50 by weight). The thickness of the TPU membrane was 400 micrometers. FIG. 8 shows that a gas permeable waterproof membrane comprising porous TPU with a fluoro-alkyl based polymer hydrophobic coating is suitable for use as a material for an artificial gill garment.

From reading the present disclosure, other variations and modifications will be apparent to the skilled person. Such variations and modifications may involve equivalent and other features which are already known in the art of gas permeable waterproof membranes, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. An artificial gill garment for providing oxygen to a wearer in an underwater environment, the artificial gill garment comprising:
   a flexible, gas permeable membrane configured to allow permeation of air through the membrane and prevent permeation of water through the membrane; wherein the membrane is configured to allow unconstrained natural movement of the wearer;
   wherein the membrane is configured to provide an air reservoir between a plurality of surfaces of the membrane and is configured to fit over a part or whole of a torso of the wearer;
   wherein the membrane comprises a mask portion in fluid communication with the air reservoir, and configured to fit over at least facial respiratory features of the wearer;
   wherein the membrane or an outer surface of the membrane comprises a surface pattern and/or surface configuration to increase a surface area of the outer surface; and
   wherein the membrane is or comprises a porous hydrophobic material, wherein the porous hydrophobic material comprises polypropylene.

2. The artificial gill garment of claim 1, wherein the porous hydrophobic material comprises a hydrophobic coating.

3. The artificial gill garment of claim 1, wherein the increased surface area of the outer surface is provided by one or more undulations, creases, pockets, folds or pleats.

4. The artificial gill garment of claim 1, wherein the artificial gill garment comprises a rebreather configured to extract carbon dioxide from breath of the wearer exhaled to the air reservoir to enable rebreathing of unused oxygen of the exhaled breath of the wearer.

5. The artificial gill garment of claim 1, wherein the artificial gill garment comprises an oxygen tank configured to store oxygen and supply oxygen to the air reservoir.

6. The artificial gill garment of claim 1, wherein the gas permeable waterproof membrane is formed from a precursor material composition, the composition comprising a mixture of a hydrophobic material and a hydrophilic material.

7. The artificial gill garment of claim 6, wherein:
   the hydrophobic material is or comprises a hydrophobic elastomeric polymer.

8. The method of claim 7, further comprising treating a surface of the membrane to impart hydrophobic properties.

9. The artificial gill garment of claim 1, wherein the membrane is or comprises a porous superhydrophobic material.

10. A method of manufacturing the artificial gill garment of claim 1, the method comprising:
    casting or three-dimensional printing the garment in a desired shape, the printed garment being air permeable and water impermeable.

11. The method of claim 10, further comprising forming one or more air permeable and water impermeable regions in the printed garment.

12. The method of claim 10, wherein the filament comprises a composite filament of a hydrophobic material and hydrophilic material, and the method further comprises washing the printed garment in water to remove the hydrophilic material from the printed garment.

13. The method of claim 12, wherein:
    the hydrophobic material is or comprises a hydrophobic elastomeric polymer.

14. The method of claim 10, further comprising coating the printed garment with a hydrophobic or superhydrophobic coating.

15. The method of manufacturing the artificial gill garment according to claim 10, comprising manufacturing the gas permeable waterproof membrane by:
- producing a mixture of a hydrophobic material and a hydrophilic material;
- forming a membrane from the mixture of hydrophobic material and hydrophilic material;
- creating pores in the membrane by washing the membrane in water to remove the hydrophilic material from the membrane.

16. The method of claim 15, wherein:
- the hydrophobic material is or comprises an hydrophobic elastomeric polymer.

* * * * *